A. BONTEMPS AND G. N. VIS.
APPARATUS FOR THE CONTINUOUS SEPARATION OF SOLIDS FROM LIQUIDS.
APPLICATION FILED NOV. 21, 1917.

1,382,056.

Patented June 21, 1921.
4 SHEETS—SHEET 1.

A. BONTEMPS AND G. N. VIS.
APPARATUS FOR THE CONTINUOUS SEPARATION OF SOLIDS FROM LIQUIDS.
APPLICATION FILED NOV. 21, 1917.

1,382,056.

Patented June 21, 1921.
4 SHEETS—SHEET 3.

Inventors:-
Antoine Bontemps + Gerhard N. Vis
By Mauro, Cameron, Lewis + Massie,
Attorneys

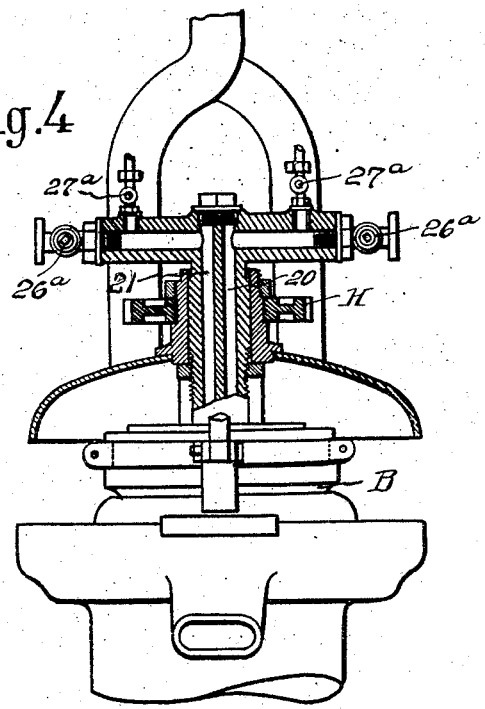

UNITED STATES PATENT OFFICE.

ANTOINE BONTEMPS AND GERHARD NICOLAAS VIS, OF PARIS, FRANCE.

APPARATUS FOR THE CONTINUOUS SEPARATION OF SOLIDS FROM LIQUIDS.

1,382,056.  Specification of Letters Patent.  Patented June 21, 1921.

Application filed November 21, 1917. Serial No. 203,279.

*To all whom it may concern:*

Be it known that we, ANTOINE BONTEMPS and GERHARD NICOLAAS VIS, of 10 Rue de Vienne, Paris, France, chemists, have invented a new and useful Improvement in Apparatus for the Continuous Separation of Solids from Liquids, which improvement is fully set forth in the following specification.

In the processes employed in commerce for separating solids from liquids, whether turbines, filter presses, suction apparatus or compressed air are employed, it is necessary to stop the apparatus to fill and empty it; the processes are not therefore continuous and only a fraction of the material can be treated at one time. Moreover, to fill and empty the apparatus requires considerable hand labor and uniform products are not always obtained.

This invention relates to a continuous process for separating solids from liquids and to apparatus for carrying out such process.

According to this invention mixed solids and liquids are forced upwardly into a chamber whose outer walls are perforated and serve as a filter while its inner walls are formed of a screw threaded rotating member here shown as a cone.

Figure 1:
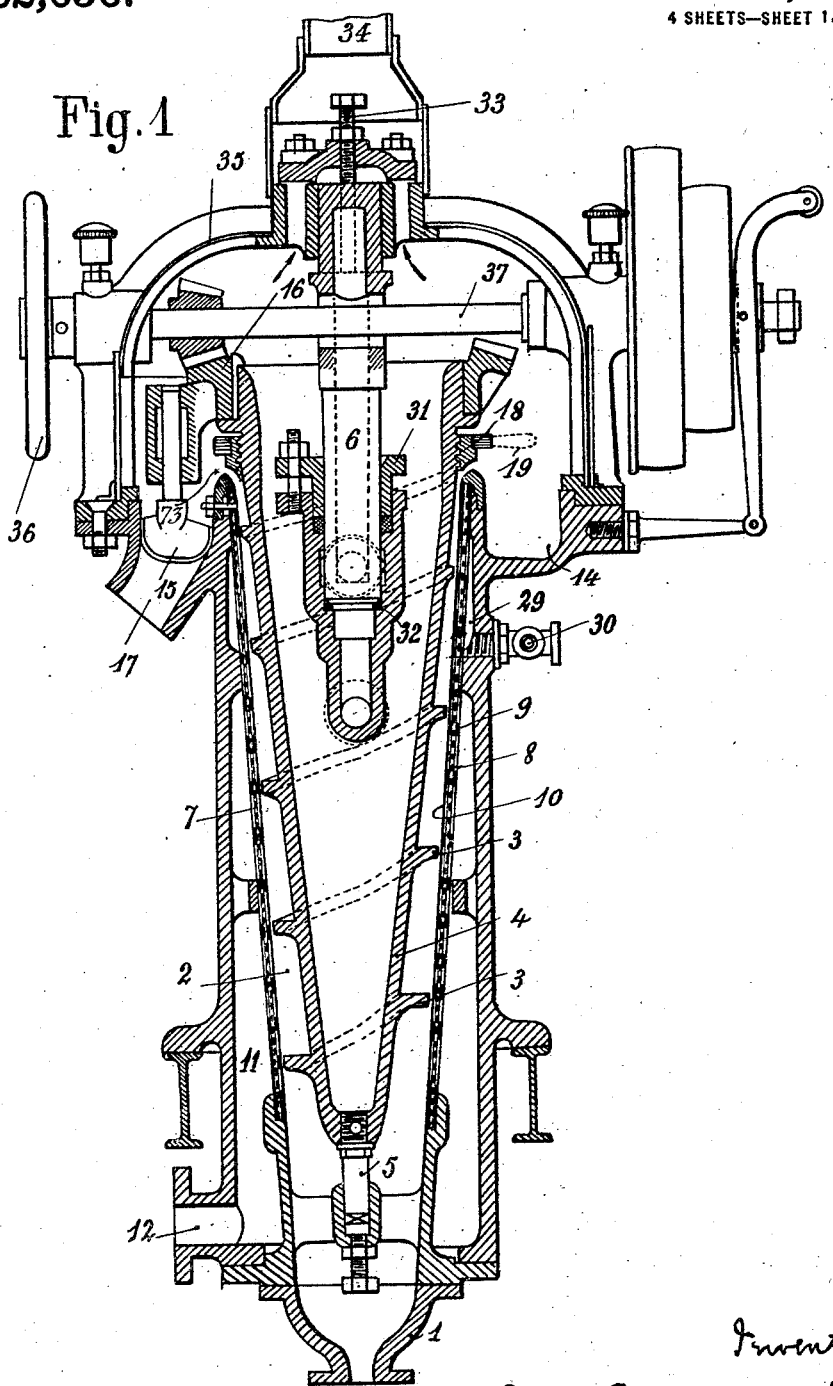
Figure 2:
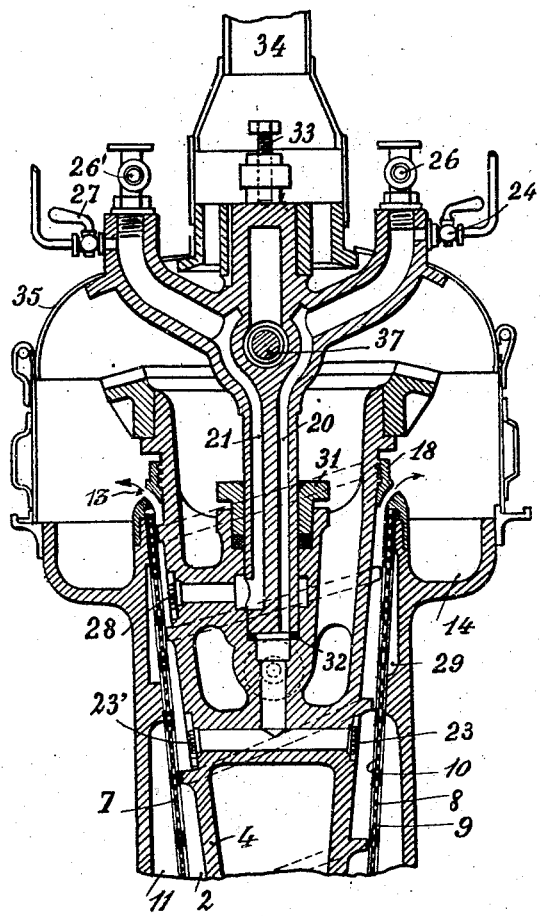
Figure 3:
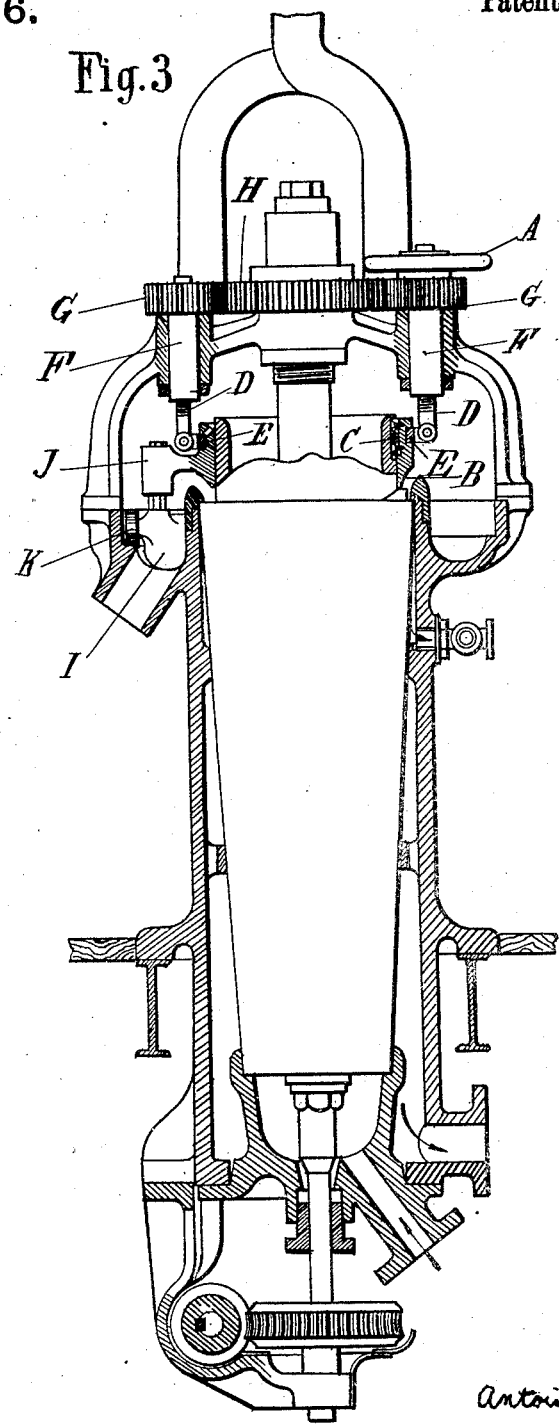

The invention is illustrated in the accompanying drawings, in which Figure 1 is a vertical section through the axis of the apparatus, Fig. 2 is a partial vertical section taken on a plane at right angles to that of Fig. 1; Fig. 3 shows a modification and Fig. 4 is a partial view of another modification.

In Figs. 1 and 2 the mass to be treated is pumped in through the pipe 1 into the filtering chamber 2 which contains a cone 4 having upon it a screw thread 3. The cone 4 is provided at its lower end with a pivot 5 and its upper end is guided by a central guide 6.

The mixed liquids and solids are pressed by the action of the pump against the inner surface of the filter 7 which is formed of metal gauze 8 held between two perforated metal cones 9 and 10.

Liquid passes out through the gauze 8 into a chamber 11 provided with an outlet 12.

The cone 4 is rotated by gearing or in any other suitable manner. The solids contained in the mass will accumulate on the upper threads of the screw and will by its rotation and by the pressure imparted by the pump be raised to an outlet 13 and so pass into an annular chamber 14, from which they are ejected through a passage 17 by a scraper 15 secured to the gear wheel 16 or the cone 4.

The outlet 13 for the solids is annular and its aperture is regulated by a screw nut 18; the outlet may on starting be entirely closed. The nut 18 is manually operated by a handle 19 and it is necessary to stop the apparatus to do this as the nut 18 is mounted on the cone 4 and turns with it.

The solids or crystals which have been separated from the major portion of the liquid still contain adherent impurities and are therefore before they pass out through the outlet 13 subjected to washing operations.

For this purpose the central guide 6 is provided with passages 20 and 21 and mother liquor or other washing liquid is delivered to several points of the cone 4 through the passages 20 and 21 and cocks 26 and 26'.

The passage 20 leads to perforations 23 and 23'. If it be desired to heat the washing liquid steam is admitted through the cock 24.

The solids as they are raised by the rotation of the screw threaded cone are washed when they come opposite the perforations 23 and 23' and therefore the whole mass of solids will be washed, the liquid passing out as before through the outlet 12.

The steam admitted through cock 24 also serves to clear out the perforations 23 and 23' when the machine is not working.

The passage 21 is supplied through cocks 26' and 27 with water and steam, thus allowing a second washing to be effected, or if desired compressed air may be employed to squeeze out the greater portion of the liquid adhering to the solids. The passage 21 may lead to several outlets although one 28 only is shown. The injected liquid flows into a separate chamber 29 and out through a valve 30. The outlet 28 may be cleared by letting in steam through the cock 27.

Leakage from the passages in the cone 4 and the guide 6 are prevented by a stuffing box 31 and washer 32 upon which the guide 6 is pressed by the action of the tightening screw 33.

34 is a flue through which steam and injurious gases pass away.

36 is a fly wheel keyed on the shaft 37, the fly wheel being rotated, and therefore the cone 4, in the reverse direction to the normal when it is desired to empty or clean the apparatus.

In Figs. 3 and 4 modifications are shown which have for their object to avoid stopping the machine when it is desired to alter the size of the annular orifice 13 while the apparatus is running.

For this purpose the slide B is, as indicated in Fig. 3, operated by a hand wheel A; the slide is mounted upon the cone and turns with it by reason of tongue-and-groove connection C, but can be moved vertically upward and downward by the action of screw rods D secured to a ring E and working in nuts F provided with toothed wheels G gearing with a central idler gear wheel H.

The scraper I is rotated by the slide B having an upwardly extending arm which can slide vertically in the sleeve J; a roller K mounted on the scraper runs upon a circular track cast with the chamber.

In this construction the cone is rotated from below through a worm and worm wheel.

Fig. 4 shows a modified form of central guide having passages 20, 21 for the inlet of washing fluids through cocks 26ª and 27ª.

Claims—

1. In a continuous separating apparatus of the character described, the combination of a vertical cylinder provided with an outlet near its base, an inverted-cone-shaped filtering wall supported therein and having a bottom inlet and an annular upper outlet, an inverted-cone-shaped conveyer-screw with a greater included angle than the cone-shaped filtering wall and revolubly mounted within said filter wall, a receiving trough surrounding the upper end of said cylinder and having an outlet in its bottom, and conveying means working in said trough.

2. In a continuous separating apparatus of the character described, the combination of a vertical cylinder provided with an outlet near its base, an inverted-cone-shaped filtering wall supported therein and having a bottom inlet and an annular upper outlet, means for adjusting the size of said annular outlet, an inverted-cone-shaped conveyer-screw with a greater included angle than the cone-shaped filtering wall and revolubly mounted within said filter wall, a receiving trough surrounding the upper end of said cylinder and having an outlet in its bottom and conveying means working in said trough.

3. In apparatus for separating solids from liquids, the combination of an outer cylindrical receptacle for receiving the percolate provided with an exterior trough surrounding the upper end thereof, a cone-shaped filtering wall supported in said receptacle forming a conical chamber having an inlet for receiving liquids and solids to be separated, a hollow cone-shaped conveyer-screw working in said chamber and forming, with the filtering wall, a spiral channel communicating at one end with said inlet and at the opposite end with said trough, means mounted on said screw for adjusting the size of the delivery end of said channel and other means on said screw for scraping solids out of said trough delivered thereto from said channel, and conduit means delivering washing fluid to the upper end of said channel through the walls of said screw.

In testimony whereof we have signed this specification in the presence of two subscribing witnesses.

ANTOINE BONTEMPS.
GERHARD NICOLAAS VIS.

Witnesses:
　Chas. P. Pressly,
　Gaston de Mestral.